United States Patent [19]

Brum et al.

[11] Patent Number: 5,501,411
[45] Date of Patent: Mar. 26, 1996

[54] TOWED VEHICLE DEPLOYMENT APPARATUS HAVING GUIDE TO REDUCE LINE PULL-OFF ANGLE

[75] Inventors: Roger D. Brum; David T. Currier, both of Irvine, Calif.

[73] Assignee: Southwest Aerospace Corporation, Tustin, Calif.

[21] Appl. No.: 213,907

[22] Filed: Mar. 14, 1994

[51] Int. Cl.⁶ .................................................. B65H 27/00
[52] U.S. Cl. ........................................ 242/397; 242/397.5
[58] Field of Search ................................. 242/397, 397.2, 242/397.5, 566, 615.4, 157 R; 244/3.12, 1 TD, 137.1, 137.3, 137.4

[56] References Cited

U.S. PATENT DOCUMENTS

| | | | |
|---|---|---|---|
| 715,691 | 12/1902 | Porter, Jr. | 182/239 |
| 1,097,721 | 5/1914 | Koch | 242/566 |
| 1,206,676 | 11/1916 | Cote | 182/239 |
| 1,531,926 | 3/1925 | Hallot | 188/185 |
| 2,119,550 | 6/1938 | Loughridge | 188/270 |
| 2,156,294 | 5/1939 | Kessenich | 244/138 R |
| 2,396,071 | 3/1946 | Anderson | 258/1.2 |
| 2,448,343 | 8/1948 | Zandmer | 89/1,816 |
| 2,486,999 | 11/1949 | Tapp | 258/1.2 |
| 2,923,549 | 2/1960 | Hopper et al. | 244/1 TD |
| 2,953,377 | 9/1960 | Brust | 273/361 |
| 2,967,683 | 1/1961 | Crater | 244/110 A |
| 2,998,754 | 9/1961 | Bialy | 89/1,816 |
| 3,871,321 | 3/1975 | Giebel et al. | 89/1.14 |
| 4,029,298 | 6/1977 | Lassche | 182/238 |
| 4,062,112 | 12/1977 | Lake | 89/1.14 |
| 4,127,295 | 11/1978 | Robinson | 242/397.5 X |
| 4,416,429 | 11/1983 | Jessamine | 242/100.1 |
| 4,469,196 | 9/1984 | Sadler | 188/270 |
| 4,598,882 | 7/1986 | Opdahl | 244/1 TD |
| 4,607,849 | 8/1986 | Smith et al. | 273/348.1 |
| 4,718,320 | 1/1988 | Brum | 89/1.11 |
| 4,756,489 | 7/1988 | De Varennes | 242/157 R X |
| 4,770,368 | 9/1988 | Yates et al. | 244/1 |
| 4,883,232 | 11/1989 | Marchetti | 242/566 X |
| 5,257,746 | 11/1993 | Norrvi et al. | 242/397.5 |

Primary Examiner—Daniel P. Stodola
Assistant Examiner—William A. Rivera
Attorney, Agent, or Firm—Stetina Brunda & Buyan

[57] ABSTRACT

A towed vehicle deployment apparatus comprising a stationary housing having a spool rotatably connected thereto. Dispensably stored in windings about the spool is the tow line. Rigidly attached to the housing is a line guide and a standoff bar. The tow line is extended from the spool over the standoff bar and subsequently over the line guide for purposes of reducing the pull-off angle of the tow line from the spool.

13 Claims, 2 Drawing Sheets

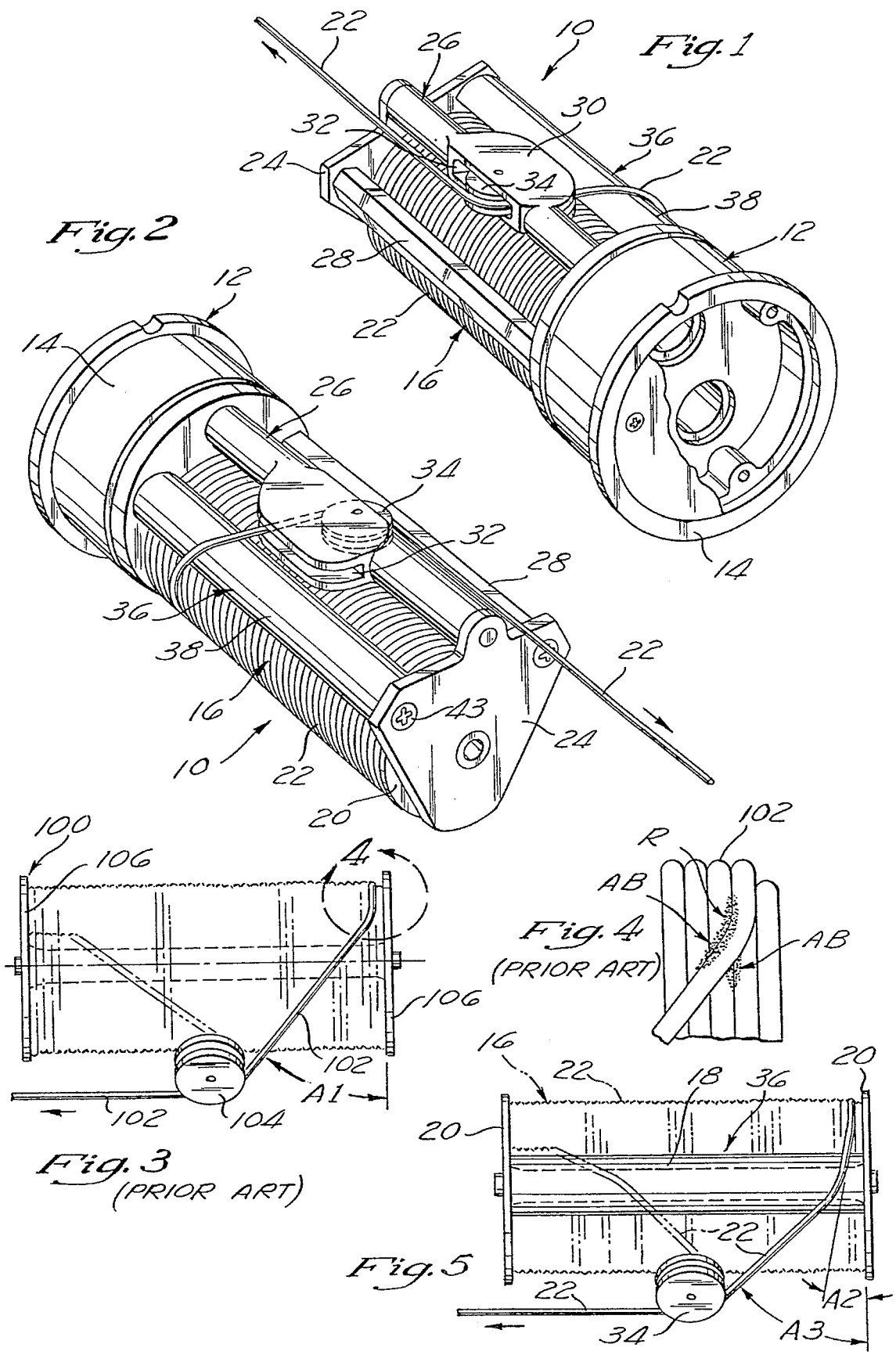

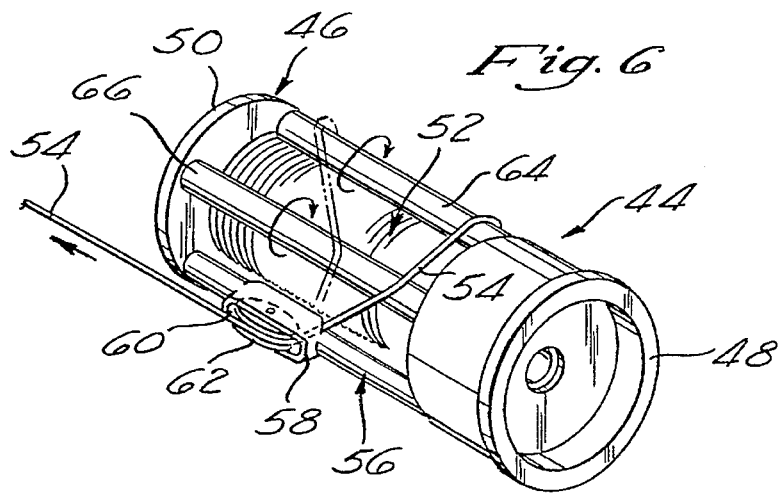
Fig. 6
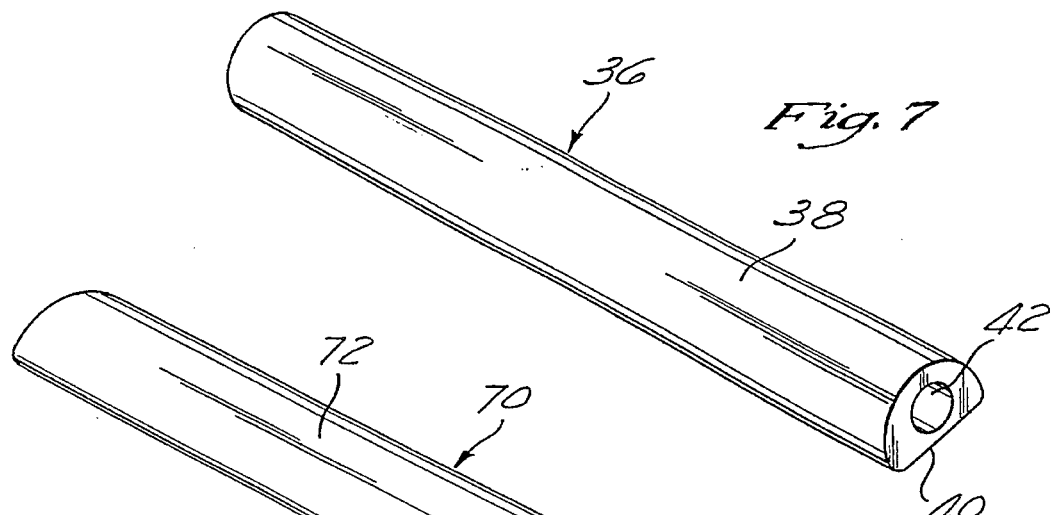
Fig. 7
Fig. 8
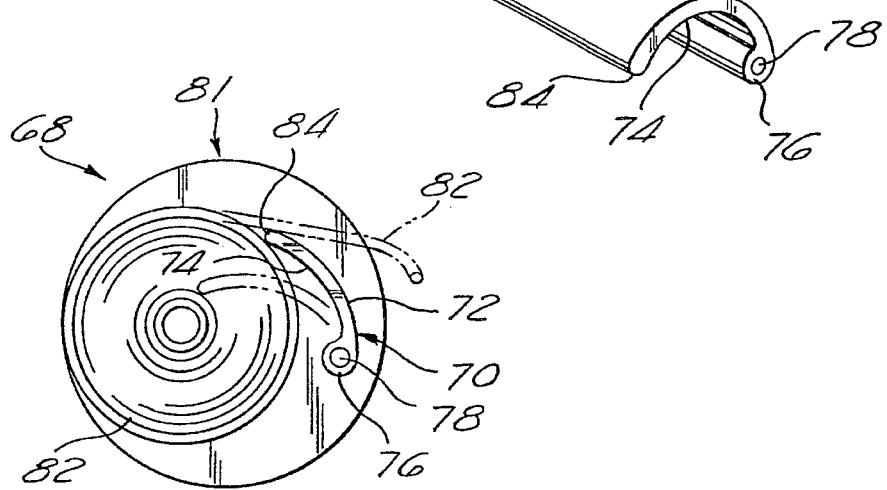
Fig. 9

TOWED VEHICLE DEPLOYMENT APPARATUS HAVING GUIDE TO REDUCE LINE PULL-OFF ANGLE

FIELD OF THE INVENTION

The present invention relates generally to towed vehicles, such as aerial targets and expendable decoys, and more particularly, to a towed vehicle deployment apparatus adapted to reduce occurrences of tow line breakage by incorporating a guide to reduce the pull-off angle of the tow line from a spool.

BACKGROUND OF THE INVENTION

In military applications, two types of towed vehicles are well-known and often used for weapons/gunnery practice and aircraft protection. These vehicles are aerial towed targets and aerial towed decoys, respectively. Aerial towed targets are typically towed behind an aircraft and used in conjunction with pilot training exercises. Aerial towed decoys are used to draw various types of guided weapons away from an aircraft that the weapons are intended to destroy and/or used to evaluate the effectiveness of guided weapon systems. An example of an aerial target is shown in U.S. Pat. No. 4,205,848 to Smith et al., with examples of aerial decoys being shown in U.S. Pat. Nos. 4,718,320 to Brum and 4,852,455 to Brum, the disclosures of which are incorporated herein by reference.

Aerial towed targets and decoys which include electronic devices and circuitry incorporated therein have been known in the prior art for many years. In particular, aerial targets often include various electronic devices which are used for purposes of scoring the pilot's performance during a training exercise. Electronic decoys contain various types of electronic circuits to create an apparent target to a weapon to attract the weapon to the decoy, rather than the aircraft. One such active electronic device is a transponder which is adapted to receive radar signals and rebroadcast an amplified return signal. In addition to electronic decoys, various types of thermal decoys are known in the prior art which include flares designed to attract infrared guided missiles. The flare or transponder of the decoy is designed to present a larger thermal or electronic target than the aircraft from which it is deployed and thereby attract the weapon away from the aircraft. As the programming of anti-aircraft weaponry becomes more sophisticated to better discriminate between decoys and aircraft, the need to provide decoys with enhanced capabilities similarly evolves. Moreover, insofar as different anti-aircraft weapons utilize different types of electronic or thermal imaging systems, there exists a need to maintain an adequate inventory of decoys to defeat an attack by any of a variety of different types of anti-aircraft weapons that may be fired at the aircraft.

Though some types of aerial targets are intended to be recoverable, the majority are intended to be nonrecoverable or sacrificial. As will be recognized, decoys by their very nature are intended to be exclusively sacrificial since the tow line is typically cut at the aircraft at the end of a flight or mission, or immediately upon the destruction of the decoy. One of the most critical stages in the utilization of both recoverable and sacrificial towed vehicles is in the initial deployment thereof. In the event a towed vehicle, and especially a decoy, is destroyed by a missile or other weapon, it is desirable to deploy a second decoy as rapidly as possible. The difficulty regarding deployment lies in the fact that the tow line must be able to withstand the extreme amount of tensile force exerted thereon by the drag of the vehicle during the deployment operation, particularly at the end of the payout of the vehicle.

In one currently known deployment technique, the tow line is wrapped or folded at either the aircraft end or the towed vehicle end, and allowed to pay out freely without braking. This particular deployment technique is primarily utilized in conjunction with sacrificial towed vehicles. In using this particular technique, the elasticity of the tow line must absorb the kinetic energy arising from the relative velocity of the towed vehicle to the aircraft at the end of the towed vehicle payout. As can be appreciated, oftentimes the tow line will snap during the deployment, rendering the target or decoy irretrievably lost. Additionally, this particular deployment technique is only effective at relatively low aircraft speeds since at higher aircraft speeds, the mass of the tow line itself prevents full use of its elasticity which typically results in line failure at the end of the payout.

In view of the deficiencies associated with the aforementioned deployment technique, a second more popular technique of rapidly deploying both sacrificial and recoverable towed vehicles involves the fixing of spools at either the aircraft or the towed vehicle to control the payout and braking of the tow line. The tow line is wrapped about the spool and allowed to be payed out in a controlled manner via the application of a mechanical braking force to the spool. In certain prior art systems of this type, rapid deployment of the towed vehicle is facilitated by utilizing a centrifugally applied brake in conjunction with a spool having a large outer-to-inner tow line diameter ratio. In the centrifugally applied brake, springs are typically used to hold off brake elements in a centrifugal clutch until a desired rotational speed of the spool for brake engagement is achieved. In other types of centrifugally applied brakes, shear pins or detents are used to hold off the brake elements. Once a desired rotational speed of the spool is achieved, the pins shear, thus facilitating brake engagement.

A principal limitation in the use of various types of thermal and electronic decoys is the space limitation relative to the inclusion of useful quantities of decoys on an aircraft. In this respect, it is often desirable to dispose a decoy deployment system within the aircraft space used for an existing flare, chaff or other expendable decoy round. Packaging the required tow line length into the narrow spaces which are usually available in the aircraft typically necessitates the use of tow line spools which are longer (sometimes several times) than their diameter. When the tow line is pulled from the spool through a guide disposed intermediate the spool flanges, it forms a pulloff angle with respect to the remainder of the tow line wrapped about the spool. As the spool length increases in relation to its diameter, the maximum pull-off angle also increases. Since the tow line is under high tension loads when a towed vehicle is deployed at high air speeds, the combination of the small bend radius of the tow line and the line-to-line abrasion caused by the high pull-off angle often results in tow line breakage at only a fraction of its rated load. As such, it is highly desirable to reduce the tow line pull-off angle to minimize occurrences of tow line breakage. Though the pull-off angle may be reduced by moving the guide radially outward away from the spool, the same spacial limitations that necessitate the use of an elongate, narrow spool preclude such a design modification.

The present invention addresses the aforementioned need in the prior art by providing a deployment apparatus wherein the tow line is routed from the spool over one or more bars located peripherally around the spool. Such routing effectively increases the distance from the point where the tow line leaves the spool to the guide, thereby reducing the pull-off angle, while not significantly increasing the size or packaging volume of the deployment apparatus. The bars may be rotatably mounted on bearings, or may be stationary and include a low-friction coating applied thereto.

SUMMARY OF THE INVENTION

In accordance with a first embodiment of the present invention, there is provided a towed vehicle deployment apparatus comprising a stationary housing having a spool rotatably connected thereto. Dispensably stored in windings about the spool is a tow line, while connected to the distal end of the tow line is a towed vehicle such as a decoy.

Rigidly attached to the housing is a line guide, with the tow line being extended from the spool over the line guide. Also rigidly attached to the housing is at least one standoff bar. In the first embodiment, the tow line is extended over the standoff bar prior to being extended over the line guide for purposes of reducing the pull-off angle of the tow line from the spool. The standoff bar preferably has a semi-circular cross-sectional configuration and defines an arcuately contoured outer surface over which the tow line is extended and drawn. The outer surface preferably includes a low-friction coating applied thereto which presents a reduced friction surface for the tow line, while providing for the thermal dissipation of the frictional heat generated during the payout of the tow line from the spool. The standoff bar may alternatively be rotatably connected to the housing and have a circular cross-sectional configuration.

In accordance with a second embodiment of the present invention, the towed vehicle deployment apparatus may include a pair of standoff bars rigidly attached to the housing, with the tow line being extended from the spool over each of the standoff bars in succession prior to being extended over the line guide. Each of the standoff bars may be formed having a semi-circular cross-sectional configuration defining a coated, arcuately contoured outer surface over which the tow line is extended and drawn. Alternatively, the standoff bars may be rotatably connected to the housing and formed with circular cross-sectional configurations.

In accordance with a third embodiment of the present invention, the standoff bar may be pivotally connected to the housing and adapted to pivot toward the spool as the tow line is dispensed therefrom. The pivotal standoff bar also defines a coated, arcuately contoured outer surface over which the tow line is extended and drawn.

BRIEF DESCRIPTION OF THE DRAWINGS

These, as well as other features of the present invention, will become more apparent upon reference to the drawings wherein:

FIG. 1 is a rear perspective view of a deployment apparatus constructed in accordance with a first embodiment of the present invention;

FIG. 2 is a front perspective view of the deployment apparatus constructed in accordance with the first embodiment of the preset invention;

FIG. 3 is a side elevational view of a prior art deployment apparatus;

FIG. 4 is an enlarged view of the encircled region shown in FIG. 3;

FIG. 5 is a side elevational view of the spool of the deployment apparatus shown in FIGS. 1 and 2;

FIG. 6 is a rear perspective view of a deployment apparatus constructed in accordance with a second embodiment of the present invention;

FIG. 7 is a perspective view of a standoff bar used in the deployment apparatus shown in FIGS. 1, 2 and 5;

FIG. 8 is a perspective view of a standoff bar used in a deployment apparatus constructed in accordance with a third embodiment of the present invention; and FIG. 9 is a side elevational view of the deployment apparatus constructed in accordance with the third embodiment of the present invention incorporating the standoff bar shown in FIG. 8.

DETAILED DESCRIPTION OF THE PREFERRED EMBODIMENTS

Referring now to the drawings wherein the showings are for purposes of illustrating preferred embodiments of the present invention only, and not for purposes of limiting the same, FIGS. 1 and 2 perspectively illustrate a towed vehicle deployment apparatus 10 constructed in accordance with a first embodiment of the present invention. The deployment apparatus 10 comprises a stationary housing 12 which itself comprises a cylindrically configured, hollow brake drum 14. Rotatably connected to the brake drum 14 is a spool 16 defining an elongate, tubular central portion 18 having a pair of circularly configured spool flanges 20 attached to the opposed ends thereof in a manner wherein the central portion 18 extends axially therebetween. Though not shown, the spool 16 further includes a cylindrically configured rotor portion which is attached to the outer surface of one of the spool flanges 20. Disposed within the rotor portion is a brake assembly such as that described in Applicant's co-pending application entitled TOWED VEHICLE DEPLOYMENT APPARATUS INCORPORATING MECHANICAL BRAKE. The rotatable connection of the spool 16 to the brake drum 14 is facilitated in a manner wherein the rotor portion resides within the brake drum 14. Upon the spool 16 reaching a predetermined rotational speed, the brake assembly is adapted to contact the brake drum so as to apply a braking force to the spool 16.

Dispensably stored in windings about the spool 16, and in particular the central portion 18 thereof, is a tow line 22. The tow line 22 is maintained upon the central portion 18 by the spool flanges 20. Additionally, the tow line 22 is sized such that when completely wound about the central portion 18, the outer-most layer thereof is substantially flush with the peripheral edges of the spool flanges 20. Though not shown, attached to the distal end of the tow line 22 is an aerial-towed vehicle such as an aerial target or aerial decoy.

In addition to the brake drum 14, the housing 12 further comprises a stationary, triangularly configured end plate 24. In the preferred embodiment, the spool flange 20 which does not include the rotor portion attached thereto (i.e., is not rotatably connected to the brake drum 14) is itself rotatably connected to the end plate 24. Extending longitudinally relative the spool 16 (i.e., in parallel relation to the central portion 18) in spaced relation to the outer-most layer of the tow line 22 is a line guide 26 and a brace bar 28, the opposed ends of which are rigidly attached to the brake drum 14 and end plate 24. The line guide 26 is formed in a manner wherein the pulley 34 is disposed approximately midway between the spool flanges 20 when the line guide 26 is attached to the brake drum 14 and end plate 24. The line guide 26 defines an enlarged middle portion 30 having a slot 32 extending therethrough. Partially inserted into the slot 32 and rotatably connected to the middle portion 30 is a pulley 34. The line guide 26 and brace bar 28 are each components of the housing 12, with the brace bar 28 having a hexagonal cross-sectional configuration and being adapted to provide the housing 12 with enhanced structural integrity.

As best seen in FIGS. 2 and 7, also extending longitudinally relative the spool 16 in spaced relation to the outer-most layer of the tow line 22 is an elongate standoff bar 36, the opposed ends of which are rigidly attached to the brake drum 14 and end plate 24. In the preferred embodiment, the standoff bar 36 has a semicircular cross-sectional configuration defining an arcuately contoured outer surface 38 and a generally planar inner surface 40. Extending longitudinally throughout the entire length of the standoff bar 36 is an aperture 42 which functions to reduce the weight thereof. The aperture 42 is also adapted to allow an elongate screw 43 to be extended through the standoff bar 36 for purposes of fastening the end plate 24, standoff bar 36 and brake drum 14 to each other. The standoff bar 36 is extended between the brake drum 14 and end plate 24 in a manner wherein the inner surface 40 is disposed closest the outer-most layer of the tow line 22.

As seen in FIGS. 1 and 2, the deployment apparatus 10 is assembled in a manner wherein the tow line 22 extends from the spool 16, over the outer surface 38 of the standoff bar 36, and into the slot 32 disposed within the enlarged middle portion 30 of the line guide 26. When extended through the slot 32, the tow line 22 is received into a complimentary channel formed in the peripheral edge of the pulley 34. As will be discussed in more detail below, the extension of the tow line 22 over the outer surface 38 of the standoff bar 36 effectively increases the distance from the point where the tow line 22 leaves the spool 16 to the line guide 26, thereby reducing the pull-off angle and minimizing occurrences of tow line breakage during the deployment of a towed vehicle at high air speeds.

As previously explained, it is often desirable to dispose a towed vehicle deployment apparatus into the aircraft space used for an existing flare, chaff or other expendable decoy round. Referring now to FIGS. 3 and 4 which are related to a prior art towed vehicle deployment apparatus, packaging the required tow line length into the narrow spaces which are usually available in the aircraft typically necessitates the use of a tow line spool 100 which is longer than its diameter. When the tow line 102 is pulled from the spool 100 over a line guide pulley 104 disposed intermediate the spool flanges 106 of the spool 100, the tow line 102 forms a pull-off angle A1 in relation to the remainder of the tow line 102 wrapped about the spool 100. As the length of the spool 100 increases in relation to the diameter of the spool flanges 106, the maximum pull-off angle A1 increases. Since the tow line 102 is under high tension loads when a towed vehicle is deployed at high air speeds, the combination of the small bend radius R and the line-to-line abrasion (shown at AB) caused by the high pull-off angle A1 results in the breakage of the tow line 102 at only a fraction of its rated load. As such, it is very desirable to reduce the pull-off angle A1 of the tow line 102 to minimize occurrences of tow line breakage. Though the pull-off angle A1 may be reduced by moving the pulley 104 of the line guide radially outward and away from the spool 100, the space constraints that mandate the use of the narrow spool 100 preclude such a design modification.

Referring now to FIG. 5, the deployment apparatus 10 constructed in accordance with the present invention addresses the aforementioned limitations by routing the tow line 22 from the spool 16 over the outer surface 38 of the standoff bar 36 prior to the extension thereof over the pulley 34 of the line guide 26. The extension of the tow line 22 over the standoff bar 36 effectively increases the distance from the point where the tow line 22 leaves the spool 16 to the pulley 34 of the line guide 26, thereby reducing the pull-off angle from the angle A1 to the angle A2, while not significantly increasing the size (i.e., volume) of the deployment apparatus 10. Importantly, the pull-off angle A2 achieved through the utilization of the standoff bar 36 is significantly less than the pull-off angle A1, thereby reducing occurrences of tow line breakage.

In the deployment apparatus 10, the standoff bar 36 is formed with the semi-circular cross-sectional configuration so as to maximize the radius of the outer surface 38 over which the tow line 22 is drawn within a given space. Maximizing the radius of the outer surface 38 is of extreme importance due to the break strength of many tow line materials (such as KEVLAR from which the tow line 22 is preferably fabricated) being inversely proportional to the radius over which the tow line is pulled. The standoff bar 36 is preferably fabricated from hard anodized aluminum which is impregnated with TEFLON such that the outer surface 38 presents a low-friction surface for the tow line 22, while providing good thermal dissipation of the frictional heat generated during the deployment of the towed vehicle. However, it will be recognized that other types of materials may be utilized to fabricate the standoff bar 36, with such materials preferably including a low-friction coating applied thereto.

As an alternative to the standoff bar 36 which is rigidly attached to the housing 12, the deployment apparatus 10 may be provided with a standoff bar which is rotatably connected to the brake drum 14 and end plate 24. As will be recognized, if the standoff bar is rotatably connected to the housing 12, the same will preferably have a circular rather than a semi-circular cross-sectional configuration. However, since the space constraints of the aircraft prevent the use of a circular standoff bar having a large diameter, the same presents an outer surface having a radius which is less than the radius of the outer surface 38 of the standoff bar 36. Though the circular standoff bar is less desirable than the semi-circular standoff bar 36 due to the decreased radius of the surface over which the tow line 22 is drawn, the resultant decrease in the pull-off angle resultant from the utilization of the circular standoff bar aids in minimizing occurrences of tow line breakage.

Referring now to FIG. 6, perspectively illustrated is a deployment apparatus 44 constructed in accordance with a second embodiment of the present invention. The deployment apparatus 44 is similar to the deployment apparatus 10 previously described, and comprises a stationary housing 46 which itself comprises a cylindrically configured brake drum 48. In addition to the brake drum 48, the housing 46 comprises a circularly configured end plate 50 having a diameter substantially equal to the diameter of the brake drum 48. Rotatably connected to the housing 46, and in particular the brake drum 48 and end plate 50 thereof, is an elongate spool 52. Dispensably stored in windings about the spool 52 is a tow line 54.

Extending longitudinally relative the spool 52 in spaced relation to the outer-most layer of the tow line 54 is a line guide 56, the opposed ends of which are rigidly attached to the brake drum 48 and end plate 50. The line guide 56 is configured identically to the previously described line guide 26, and defines an enlarged middle portion 58 having a slot 60 extending therethrough. Partially inserted into the slot 60 and rotatably connected to the middle portion 58 is a pulley 62.

Also extending longitudinally relative the spool 52 in spaced relation to the outer-most layer of the tow line 54 is a first standoff bar 64 and a second standoff bar 66, the opposed ends of which are rigidly attached to the brake drum 48 and end plate 50. The first and second standoff bars 64, 66 are preferably identical to the previously described standoff bar 36, and each have a semi-circular cross-sectional configuration defining an arcuate outer surface.

The deployment apparatus 44 is assembled in a manner wherein the tow line 54 extends from the spool 52, over the arcuate outer surface of the first standoff bar 64, over the arcuate outer surface of the second standoff bar 66, and into the slot 60 disposed within the enlarged middle portion 58 of the line guide 56. As previously described with respect to the standoff bar 36, the extension of the tow line 54 over the outer surfaces of the first and second standoff bars 64, 66 effectively increases the pull-off angle of the tow line 54 from the spool 52, thus minimizing occurrences of tow line breakage during the deployment of a towed vehicle at high air speeds. The outer surfaces of the first and second standoff bars 64, 66 preferably include a low-friction coating applied thereto. The first and second standoff bars 64, 66 may alternatively be rotatably connected to the housing 46, and formed with circular cross-sectional configurations.

Referring now to FIGS. 8 and 9, illustrated is a deployment apparatus 68 constructed in accordance with a third embodiment of the present invention. The deployment apparatus 68 is substantially identical to the previously described deployment apparatus 10, with the sole difference being the inclusion of a standoff bar 70 rather than the standoff bar 36. In the third embodiment, the standoff bar 70 defines an arcuately contoured, convex outer surface 72 and a concave inner surface 74. The standoff bar 70 further defines an enlarged edge portion 76 having an aperture 78 extending longitudinally throughout the entire length thereof.

In the deployment apparatus 68, the standoff bar 70 is extended longitudinally relative the spool 80 thereof in spaced relation to the outer-most layer of the tow line 82 dispensably wound about the spool 80. However, rather than being rigidly attached to the housing 81 of the deployment apparatus 68, the opposed ends of the standoff bar 70 are pivotally connected to the brake drum and end plate thereof. The deployment apparatus 68 is assembled in a manner wherein the tow line 82 extends from the spool 80 over the outer surface 72 of the standoff bar 70, and into the line guide of the deployment apparatus 68. As the tow line 82 is dispensed from the spool 80 during the deployment of the towed vehicle, the pulling of the tow line 82 over the outer surface 72 forces the rounded edge portion 84 of the standoff bar 70 (which is opposite the edge portion 76) against the remainder of the tow line 82 wound about the spool 80. Thus, as seen in FIG. 9, the standoff bar 70, and in particular the edge portion 84 thereof, pivots toward the central portion 86 of the spool 80 as the tow line 82 is dispensed therefrom.

As with the standoff bars previously described, the outer surface 72 of the standoff bar 70 preferably includes a low-friction coating applied thereto.

Additional modifications and improvements of the present invention may also be apparent to those skilled in the art. Thus, the particular parts described and illustrated herein are intended to represent only certain embodiments of the present invention, and are not intended to serve as limitations of alternative devices within the spirit and scope of the invention.

What is claimed is:

1. A reeling apparatus comprising:

a spool;

a housing, said spool being rotatably connected to said housing;

a tow line dispensably stored in windings about said spool;

a line guide attached to said housing, said tow line being extended from said spool over said line guide; and at least one standoff bar attached to said housing in generally parallel relation to said spool, said tow line being extended over said standoff bar prior to being extended over said line guide to reduce the pull-off angle of the tow line from the spool.

2. The apparatus of claim 1 wherein said standoff bar is rotatably connected to said housing.

3. The apparatus of claim 1 wherein said standoff bar defines an arcuately contoured outer surface over which the tow line is extended and drawn.

4. The apparatus of claim 3 wherein said standoff bar has a semi-circular cross-sectional configuration.

5. The apparatus of claim 3 wherein said outer surface includes a low-friction coating applied thereto.

6. The apparatus of claim 1 comprising a pair of standoff bars attached to said housing, said tow line being extended from said spool over each of said standoff bars in succession prior to being extended over said line guide.

7. The apparatus of claim 6 wherein said standoff bars are rotatably connected to said housing.

8. The apparatus of claim 6 wherein said standoff bars each define an arcuately contoured outer surface over which the tow line is extended and drawn.

9. The apparatus of claim 8 wherein each of said standoff bars has a semi-circular cross-sectional configuration.

10. The apparatus of claim 8 wherein the outer surface of each of said standoff bars includes a low-friction coating applied thereto.

11. The apparatus of claim 1 wherein said standoff bar is pivotally connected to said housing and adapted to pivot toward said spool as the tow line is dispensed therefrom.

12. The apparatus of claim 11 wherein said standoff bar defines an arcuately contoured outer surface over which the tow line is extended and drawn.

13. The apparatus of claim 12 wherein said outer surface includes a low-friction coating applied thereto.

* * * * *